United States Patent [19]

Gibson

[11] 4,287,855
[45] Sep. 8, 1981

[54] FARROWING PEN

[76] Inventor: Robert J. Gibson, R.R. #1, Brook, Ind. 47922

[21] Appl. No.: 117,057

[22] Filed: Jan. 31, 1980

[51] Int. Cl.³ .............................................. A01K 1/02
[52] U.S. Cl. .................................................... 119/20
[58] Field of Search ...................... 119/20, 15, 16, 155

[56] References Cited

U.S. PATENT DOCUMENTS

| 3,125,988 | 3/1964 | King | 119/20 |
|---|---|---|---|
| 3,181,503 | 5/1965 | Tripp | 119/20 |
| 3,216,396 | 11/1965 | Scamman | 119/20 |
| 3,276,429 | 10/1966 | Johnson | 119/20 |
| 3,318,286 | 5/1967 | Hargett, Jr. | 119/20 |
| 3,412,711 | 11/1968 | Martensson et al. | 119/20 |
| 4,121,538 | 10/1978 | Van Gilst et al. | 119/20 |

FOREIGN PATENT DOCUMENTS

| 2722858 | 11/1978 | Fed. Rep. of Germany | 119/20 |
|---|---|---|---|
| 415163 | 12/1966 | Switzerland | 119/20 |

Primary Examiner—Hugh R. Chamblee
Attorney, Agent, or Firm—Neuman, Williams, Anderson & Olson

[57] ABSTRACT

A farrowing pen is provided for accommmodating and confirming a sow or the like within a given space wherein the confined sow is permitted limited movement within the space without causing accidental injury or death to her piglets. At least one of the elongated side walls of the pen is provided with a plurality of longitudinally spaced elements. The elements are mounted for adjustment to selected positions relative to the remainder of the side wall to provide maximum nursing space for the piglets.

10 Claims, 4 Drawing Figures

U.S. Patent     Sep. 8, 1981     4,287,855
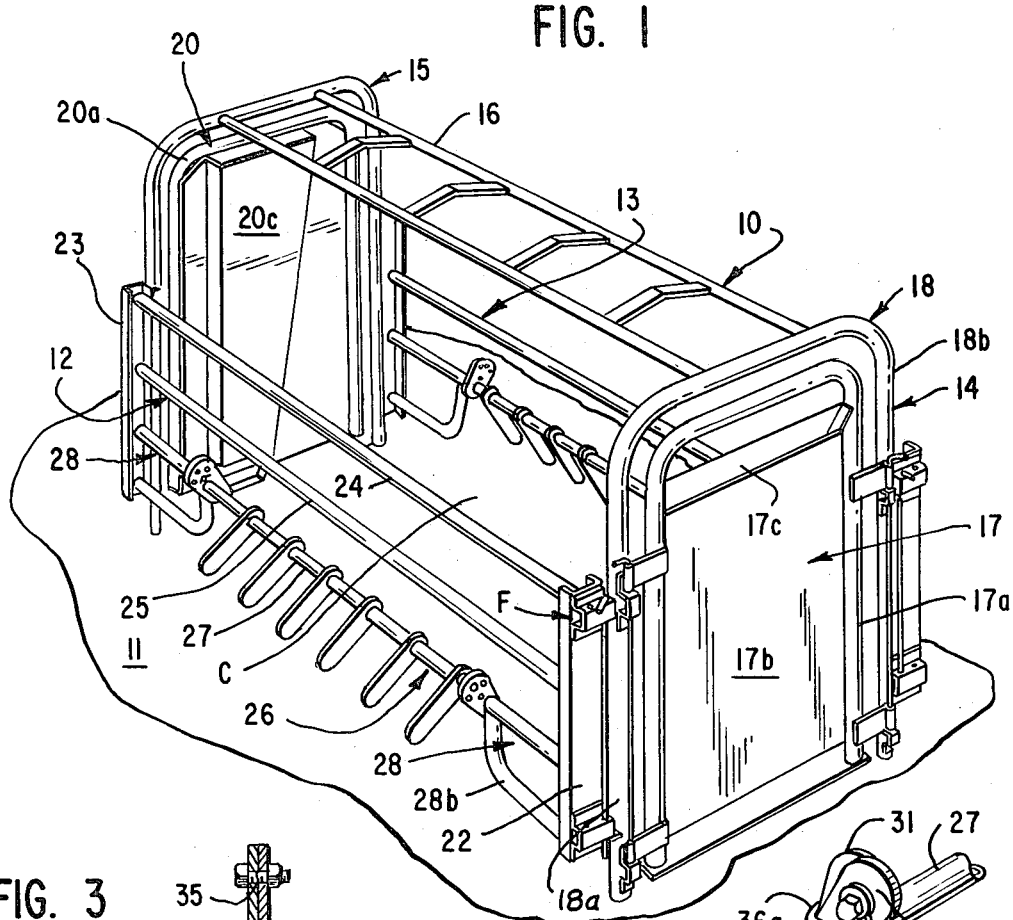
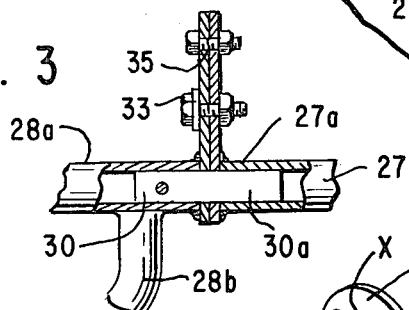
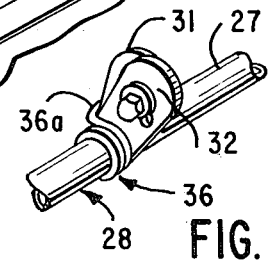
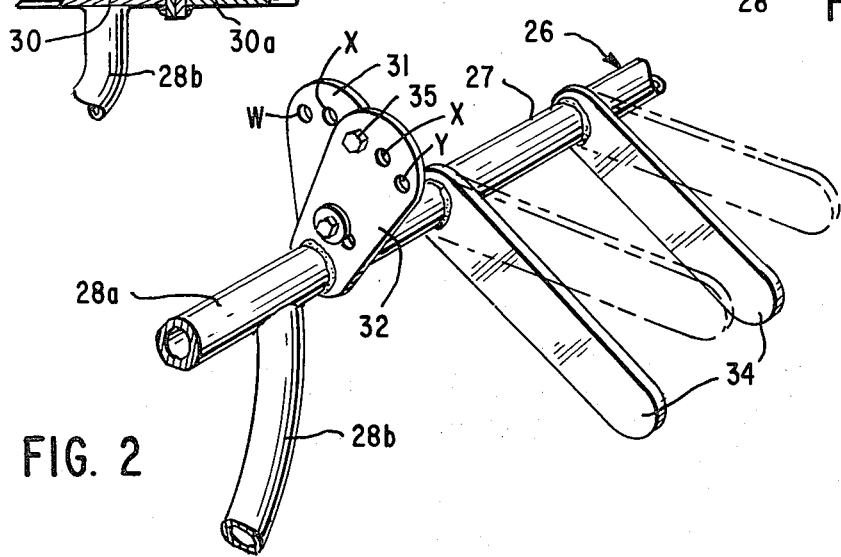

4,287,855

FARROWING PEN

BACKGROUND OF THE INVENTION

Farrowing pens, or crates, have been utilized for many years in an effort to reduce the incidents of accidental injury or killing of the piglets by being laid or stepped upon by the sow when the latter changes position within the pen during and after farrowing. Such prior pens, or crates, because of inherent structural design were beset with one or more of the following shortcomings: (a) they were incapable of properly confining sows of varying sizes and shapes; (b) they failed to provide adequate nursing space for the piglets; (c) one or more piglets were susceptible to becoming trapped for prolong periods of time or crushed to death between a wall of the pen and the confined sow; (d) cleaning of the pen was a frustrating and time consuming operation; (e) confinement of the sow within the pen was such that the sow was susceptible to injuring herself when changing position; and (f) the dimensions of the piglet access opening to the compartment in which the sow was confined could not be varied without requiring substantial disassembly of the pen.

SUMMARY OF THE INVENTION

Thus, it is an object to the invention to provide a farrowing pen which effectively overcomes the aforenoted shortcomings.

It is a further object of this invention to provide a farrowing pen embodying readily adjustable means which compensates for variations in the size and shape of the sow and piglets, and yet, safely provides maximum nursing space for the piglets.

It is a still further object to provide an improved farrowing pen wherein the various components thereof may be readily assembled or disassembled to permit cleaning or relocation of the pen when required.

It is a still further object to provide an improved farrowing pen wherein maintaining maximum nursing space may be accomplished without discomfort to the sow and without danger to the piglets.

Further and additional objects will appear from the description, accompanying drawing and appended claims.

In accordance with one embodiment of the invention, a farrowing pen is provided for mounting on a supporting surface. The pen includes a pair of elongated upright side walls arranged in spaced opposed relation, and a pair of opposed upright end walls connected to the side walls. The side and end walls coact with the supporting surface to form a compartment in which the sow is properly confined during and after farrowing. A passage is provided at least at one end of the pen to permit the sow to be readily directed into or out of the compartment. A gate is provided for closing the passage when desired. At least one of the upright side walls has the lower edge portion thereof spaced from the supporting surface and cooperating therewith so as to form an elongated opening which extends substantially the full length of the compartment. Adjustably mounted on the lower edge portion of the one side wall is an assembly having a plurality of projecting elements arranged in longitudinally spaced relation. The spacing between the elements is such that it enables the piglets to have ready access to the sow's udders while at the same time, the elements prevent the sow from sliding under and becoming wedged between the side wall and the supporting surface. The elements are mounted so that they may be manually adjusted simultaneously to various selected positions so as to compensate for the changes in size and shape of the sow and piglets during and after farrowing.

DESCRIPTION

For a more complete understanding of the invention, reference should be made to the drawing wherein:

FIG. 1 is a perspective end view of one form of the improved farrowing pen.

FIG. 2 is an enlarged fragmentary perspective view of the assembly mounted on the lower edge portion of a side wall of the pen of FIG. 1 and showing some of the components of said assembly in phantom lines in a changed position.

FIG. 3 is an enlarged fragmentary side elevational view of the components of FIG. 2 and showing segments thereof in vertical section.

FIG. 4 is similar to FIG. 3 but showing a modified construction.

Referring now to the drawing and more particularly to FIG. 1, one form of the improved farrowing pen 10 is shown mounted on a supporting surface 11. The surface may be the floor of the farrowing barn, a raised foraminous platform or the like.

The pen 10 is of skeletal construction and includes a pair of upright side walls 12, 13 arranged in opposed, substantially parallel spaced relation, and a pair of end walls 14, 15 also arranged in opposed, substantially parallel spaced relation. The side walls are removably connected to the end walls and coact therewith and with the surface 11 to form a compartment C in which a sow or similar animal is confined during and after farrowing.

A guard member 16 may be provided which overlies the top of the compartment C and has the opposite ends thereof connected to and supported by the end walls 14, 15. End wall 14 is provided with a door, or closure, 17 which in the illustrated embodiment is removably mounted on the depending leg segments 18a, 18b of an inverted U-shaped frame member 18. The lower ends of the leg segments are secured by any suitable means to supporting surface 11. The door 17 may include a frame section 17a, a panel 17b secured to the frame section and a chute 17c disposed on the inside of the panel 17b. Also positioned on the inside of the door 17 is a conventional rump guard, not shown. The opposite end wall 15 is also provided with a door, or closure 20 which is hingedly connected to the depending leg segments 21a, 21b of an inverted U-shaped frame member 21. Frame members 18, 21 are of substantially like construction and are preferably formed on tubular, or bar stock, material. The door 20 includes a frame section 20a to which is secured a panel 20b. A chute 20c may be mounted on the inside of panel 20b.

The side walls 12, 13 are of substantially like construction and each includes a pair of upright substantially parallel members 22, 23 which interconnect corresponding ends of a plurality of transverse or horizontally disposed rodlike section 24, 25. The sections 24, 25 are substantially coextensive with the overall length of the pen. Sections 24, 25 are disposed in vertically spaced, substantially parallel relation.

Also connected to upright members 22, 23 and spanning the distance therebetween is an assembly 26. The assembly 26 is disposed in spaced relation beneath section 25, see FIG. 1, and includes a center tubular section 27 having the opposite ends 27a thereof supported by bearing members 28. Each member 28 includes a tubular piece 28a having one end thereof affixed to the adjacent upright member 22, 23. The opposite end of piece 28a is provided with a fixed pin 30 having a protruding end 30a which is journalled in the adjacent end 27a of section 27. Piece 28a, pin 30 and section 27 are disposed in axially aligned relation. Each bearing member 28 also includes a bracing element 28b which has one end thereof affixed to the adjacent upright member 22, 23 but at a location spaced beneath the end of piece 28a. The opposite end of element 28b is affixed to the end of piece 28a from which pin 30 protrudes.

Each end 27a of center section 27 is provided with a laterally extending blade-like element 31. A similar blade-like element 32 is affixed to the end of piece 28a and extends laterally outwardly therefrom. Each element 31, 32 is provided with a plurality of openings W,X,Y which are arranged in annularly spaced relation relative to the longitudinal axis of the center section 27. Each opening W,X,Y is disposed at the same radial distance from the longitudinal axis section 27. In addition to openings W,X,Y, each blade-like element 31, 32 is provided with an arcuate slot Z, the center of curvature of which is substantially coincident to the longitudinal axis of center section 27. The slots Z of the elements 31, 33 are in axial registration with one another and are adapted to be engaged by the shank of a bolt 33 or the like. The slot in each instance is disposed radially inwardly from the opening W,X,Y. The bolt 33 serves to retain the bearing member 28 and the center section 27 in alignment so that the openings W,X,Y in the two elements 31, 32 will remain in proper relation as the center section 27 is adjusted relative to the bearing members 28.

A plurality of longitudinally spaced fingerlike elements 34 extend substantially radially from the tubular center section 27. One end of each element 34 is fixedly secured to section 27 thus, causing all of the elements 34 and the center section 27 to rotate as a unit about the longitudinal axis of section 27. The angular direction the elements 34 project from the lower edge of the side wall 12, 13 will depend upon which of the corresponding openings W,X,Y of the blade-like elements 31, 32 are in axially aligned relation. A pin or bolt 35 is inserted into the aligned openings.

As will be noted in FIG. 1, the blade-like elements 31, 32 protrude outwardly and upwardly from center section 27 and bearing numbers 28 so as to make the bolts 33, 35 readily accessible for adjustment without interference from a sow confined in compartment C. Furthermore, the sow cannot injure herself on the blade-like elements 31, 32 and the bolts carried thereby because of the angular disposition of the elements 31, 32. By reason of the rotational adjustment of the fingerlike elements 34, the nursing space for the piglets can be maintained at a maximum as their size increases. The wide spacing between adjacent elements 34, and the narrowness of each elements, substantially eliminates the possibility of a piglet becoming trapped or wedged between the sow and a side wall 12, 13.

Complemental fittings F are provided at each end of the side wall 12, 13 and the adjacent leg segment of the end walls 14, 15 which enable each side wall, if desired, to assume various elevated positions with respect to the supporting surface thereby further compensating for changes in the sizes of the piglets and sow during and after farrowing.

In lieu of the openings W,X,Y and the bolts 35, a biasing member (e.g. a coil spring) 36 may be utilized which will tend to urge the fingerlike elements 34 to assume a depending position. The spring 36 is carried by the bearing member 28 and one end portion 36a of the spring projects first radially outwardly and then axially so as to lodge behind the blade-like element 31 carried on the end of the center section. The tension or bias of the spring is such that it will be readily overcome in the event a piglet should become wedged between the sow and a fingerlike element 34 and thus, permit the piglet to free itself before it sustains injury.

While various portions of the pen 10 are shown to be of tubular construction it is not intended to be limited thereto. Furthermore, the size and configuration of the pen may vary from that shown without departing from the scope of the invention. Thus, an improved farrowing pen has been provided which effectively reduces the incidents of injury or death to the piglets caused by the sow wedging same against the side wall of the pen during and after farrowing. Because of the skeletal character of the pen and the adjustability of the side walls and the fingerlike elements carried thereby, cleaning of the pen is greatly facilitated. The height dimensions of the pen may be varied so as to provide maximum nursing space for the piglets.

I claim:

1. A farrowing pen comprising upright side walls, and upright end walls connected thereto and coacting therewith to form a compartment for accommodating a sow during and after farrowing; at least one side wall having a lower peripheral portion elevated relative to a surface for supporting the accommodated sow and coacting therewith to form an elongated opening for access to a nursing space, and an adjustable assembly carried by said one sidewall and adjacent said lower peripheral portion, said assembly including an elongated center section adjustable about its longitudinal axis and having a plurality of longitudinally spaced elements protruding outwardly therefrom and adjustable as a unit with said center section, relatively stationary end sections supportingly engaging opposite ends of said center sections, and complemental means mounted on said center and end sections for retaining said center section in a predetermined position of adjustment.

2. The farrowing pen of claim 1 wherein the complemental means of said adjustable assembly include a pair of blade-like members extending radially from and fixedly mounted on adjacent ends of said center section and said end sections, the blade-like member mounted on said center section being movable as a unit with said center section and the plurality of elements protruding outwardly therefrom, and means operatively engaging said blade-like member for retaining the latter in a predetermined relative position.

3. The farrowing pen of claim 2 wherein a first blade-like member is fixedly mounted on each stationary end section adjacent the end of said center section, and a complemental second blade-like member is fixedly mounted on the end of said center section adjacent said first blade-like member; said first and second blade-like members being disposed in slidable face to face relation; said retaining means being removably engageable with said first and second blade-like members and retaining said center section and the plurality of elements mounted thereon in a selected one of a plurality of positions of rotational adjustment about the longitudinal axis of said center section.

4. The farrowing pen of claim 3 wherein the first blade-like member fixedly mounted on each stationary end section protrudes outwardly from the side wall on which it is mounted and away from the sow-accommodating compartment.

5. The farrowing pen of claim 3 wherein the complemental first and second blade-like members are in at least partial registered relation with each other for all selected positions of rotational adjustment of said second blade-like member.

6. The farrowing pen of claim 2 wherein the retaining means operatively engaging the blade-like members includes a spring having one portion thereof engaging said center section adjacent one end thereof, and a second portion engaging said stationary end section, said spring biasing said center section to assume said predetermined relative position.

7. The farrowing pen of claim 6 wherein the predetermined relative position is where the longitudinally spaced elements have distal ends thereof in closest proximity to the surface on which the accommodated sow is supported.

8. The farrowing pen of claim 1 wherein at least the said one side wall is vertically adjustable relative to said end walls.

9. The farrowing pen of claim 8 wherein the adjustable assembly is vertically adjustable as a unit with the said one side wall, and the center section of said assembly is rotatably adjustable about the longitudinal axis thereof independently of said one side wall.

10. The farrowing pen of claim 9 wherein each side wall is of substantially like construction, each opening for access to the nursing space having a length substantially greater than half the length of the sow-accommodating compartment.

* * * * *